United States Patent [19]

Costello et al.

[11] 3,886,308

[45] May 27, 1975

[54] FACSIMILE RECEIVER

[75] Inventors: Matthew J. Costello, Bethel; Donald T. Dolan, Ridgefield; Andre T. Debaudringhien, Stamford; Antoon M. Hurkmans, New Milford; Kenneth R. Jasinski, Danbury; Edward G. Keplinger, Woodbury, all of Conn.

[73] Assignee: Graphic Sciences, Inc., Danbury, Conn.

[22] Filed: Dec. 7, 1972

[21] Appl. No.: 312,857

[52] U.S. Cl. ................................ 178/7.3; 178/6.6 R

[51] Int. Cl. ............................ 346 139 A; H04r 1/24

[58] Field of Search ........ 346/139 R, 139 A, 74 ES; 178/6.6 R, 7.6, 7.3

[56] References Cited

UNITED STATES PATENTS

| | | | |
|---|---|---|---|
| 3,674,923 | 7/1972 | Gifft | 178/6.6 R |
| 3,683,403 | 8/1972 | Okino | 346/139 A |
| 3,686,679 | 8/1972 | Stange | 346/139 A |

*Primary Examiner*—Howard W. Britton
*Attorney, Agent, or Firm*—Cesari and McKenna

[57] ABSTRACT

A facsimile receiver reproduces documents at remote locations automatically while unattended. The receiver includes a telephone coupler for receiving data over a telephone line, a scan converter, a single-stylus scanner, and automatic paper feed, extraction and stacking mechanisms so that a large number of documents may be reproduced and stacked in sequence in the absence of an operator.

26 Claims, 15 Drawing Figures

FACSIMILE RECEIVER

BACKGROUND OF THE INVENTION

A. Field of the Invention

The invention relates to facsimile systems, more particularly to a facsimile receiver.

B. Prior Art

Facsimile systems utilize a facsimile transmitter which scans a document and transmits signals representative of the contents of the document to a remote location where it is to be reproduced on a facsimile receiver. One example of a facsimile system is described in U.S. Pat. No. 3,614,319, issued Oct. 19, 1971 to Robert E. Krallinger et al and assigned to the assignee of the present invention. The system described in this patent utilizes a circular drum which rotates with respect to a "reading" head. The reading head generates signals indicative of the contents of a document which is wrapped around the drum, and it transmits these signals over a transmission medium to a remote receiver which reproduces the document. The facsimile system described in this patent produces excellent copy and is more than satisfactory for its intended purposes. However, it requires the use of an operator to load the document onto the transmitter and to unload the copy of the document from the receiver. In many cases it is desirable to provide facilities for at least the unattended reception of documents from remote locations.

In addition to the drum-type facsimile system described above, facsimile systems have also been built using a "flat-bed" scanning and reproducing system. In such a system, a document which is to be transmitted is placed on a flat table and scanned by a reading head moved across the document from side to side; the reading head is carried on a belt which rotates over pulleys. At the reproducing end, a stylus also carried by a belt moves across the paper from side to side in corresponding fashion to produce a copy of the original document. In order to avoid the "dead time" which occurs when the reading head or the stylus is returning to its starting position after scanning a line, a pair of reading heads and a pair of styli are commonly used.

Such a system imposes rather severe requirements on the reproduction process. The styli must be precisely located with respect to each other so that each starts reproduction of a line at the identical position on the paper: otherwise the beginning of the writing will vary from line to line and compromise the reproduction quality. It is difficult and expensive to maintain the necessary close tolerances in the manufacturing operation. Different wear rates of the styli or different forces pressing them against the copy paper may also cause adjacent lines to be reproduced with different optical densities, and this further compromises the reproduction quality.

An unattended receiver is especially advantageous wherever a large number of reports are to be received at a given station. For such an application however, it is necessary that the receiver paper feed and reproduction mechanism be especially free from jamming and other failures since there may be no attendant at hand to detect problems on their occurrence.

BRIEF DESCRIPTION OF THE INVENTION

A. Objects of the Invention

Accordingly, it is an object of the invention to provide an improved facsimile system.

Another object of the invention is to provide an improved facsimile receiver which is especially adapted for unattended reception of documents.

Yet another object of the invention is to provide an improved facsimile receiver of the flat-bed type.

A further object of the invention is to provide an improved favorable receiver of the flat bed type which uses only a single stylus.

Yet a further object of the invention is to provide an improved facsimile receiver of the flat bed type which can accomodate documents of different length.

Still a further object of the invention is to provide an improved facsimile receiver of the flat bed type which automatically reproduces a document, cuts it to a predetermined length, and stacks it for ready removal from the receiver.

Another object of the invention is to provide an improved facsimile receiver of the flat bed type which has a simple yet effective paper feed mechanism.

B. Summary of the Invention

In a preferred embodiment of the invention, we avoid stylus alignment and other problems by utilizing a single stylus fixed to a belt rotating between two pulleys. The stylus "writes" during a traversal of the copy from one side to the other; it is deactivated during its return to the initial starting position.

To accommodate the receiver to the information rate of the incoming signal, the information for each line is first read into a single-line memory at the rate of the incoming information and is then read out from this register at twice this rate. Two pairs of storage registers are used for this purpose, the first of which stores the information for the first half of the line to be reproduced, while the second register stores the information for the second half of this line. Read-out of the first register commences with the beginning of read-in for the second register, so that during the latter half of the line reproduction cycle, read-out and read-in are being performed simultaneously. At the end of read-in for each line, both registers have been fully read-out so that they are prepared to receive the information for the next line.

The reproduction of copies in the facsimile receiver described herein occurs while the receiver is unattended. Once the receiver has been turned on, in response to a signal from a remote transmitter, it thereafter automatically feeds a supply of paper to the writing position, reproduces the contents of the original document on this paper, cuts it to size, removes it from the writing position, stacks it in a tray, and awaits the next document.

The paper is supplied to the receiver in the form of a cylindrical roll of substantial capacity. A sling arrangement provides access to the roll for loading and unloading purposes. The roll is supported on a cradle formed by first and second pairs of wheels having an endless belt extending between them. The axes of the wheels are slightly skewed with respect to the diameter of the roll so that slight forces are created tending to push the roll to one side as the sheet is unwound from it. A guide pad is positioned to butt against one side of the roll to thereby precisely align it with a reference point on the writing station. An additional guide intermediate the paper roll and the writing station further initially aligns the paper sheet when a new roll is loaded into the receiver. Once the paper is properly received at the writing station, it rises above the additional guide so that friction between the paper and the guide is eliminated thereafter.

The writing station consists of a writing table and a spring-loaded bridge normally butted against an upper surface of the writing table; the paper runs over the writing table and below the bridge. The stylus belt is so positioned that it carries the stylus across the writing table from one side to the other, and this brings it into contact with the paper running over the writing table. After the stylus has completely traversed a line, it steps off the writing table onto a bridge, traverses the bridge back to the initial starting point, and then steps off the bridge onto the document once again.

The paper is advanced through the receiver a line at a time by means of a motor which drives a feed roller in contact with the paper; this motor also drives the stylus belt. The length of the sheet advanced through the machine is monitored by counting the revolutions of the feed roller and terminating the drive to it when the number of revolutions equals a predetermined count corresponding to the length of the copy to be reproduced. A second motor is also coupled to the feed roller through a one-way clutch. When the reproduction of the document is completed, the second motor is briefly energized to advance the feed roller at a rapid rate until a predetermined length of paper corresponding to the desired document size has been fed beyond the writing station. This length is selected in advance by the operator. This carries the lower edge of the document a slight distance beyond the writing station. A cutter head is then activated to cut the document to size.

The cutter head is spring-loaded on a pair of guide bars running parallel to the writing table; it carries a cutter blade which fits into a slot formed between the writing table and the bridge at their outer extremities. The cutter head is normally held in an inactive position by means of a latch which engages the cutter head. When the sheet is to be cut, the latch is retracted by means of a solonoid, thereby releasing the cutter head and allowing it to fly along the guide bars under the force of a pair of driving springs. Simultaneously, the cutter blade moves between the writing table and the bridge and travels across the writing station with the head, forcing the spring-loaded bridge slightly away from the cutter as it traverses the writing station and cutting the document as it does so. The cutter remains at the far end of the writing station until the receiver is alerted that another document is to be transmitted. When this occurs, a cutter return motor is energized; this drives a chain having two driving pins spaced 180° apart. One of these pins engages a finger on the cutter head which rotates the cutter blade to a position below the writing table and returns the head to its initial starting position, reloading the springs as it does so. At this point the driving pin releases the finger, the blade moves into cutting position, a switch is opened to stop the motor and the cutter head is latched in position for the next cut. After the document has been cut, it is removed from the writing station by means of a pair of extractor wheels positioned above a feed table. The extractor wheels have a flat surface along a limited segment thereof which initially allow unimpeded passage of the copy beneath it. After the reproduction is completed and the document cut, however, the extractor wheels are energized and their arcuate surfaces are rotated into contact with the paper, thereby frictionally engaging it and driving it toward a receiving tray.

The receiving tray comprises a spring-loaded platform having a forward edge engaged under the lip of the feed table. A bale grasps the trailing edge of the document as it leaves the extractor wheels and pulls it down onto the stacking tray, lowering the spring-loaded tray as it does so and allowing the trailing edge of the paper to flop under the lip of the feed table. The bale then returns to a neutral position above the stacking tray and the reproduction cycle is complete.

The writing stylus is a pyrographic stylus mounted in a stylus holder. The stylus is loaded both longitudinally and radially by a single spring in the holder. The longitudinal loading presses the stylus tip securely against the copy sheet on which a document is to be reproduced, while the radial loading presses the stylus body against a commutator. The commutator supplies driving current to the stylus; additionally, it acts as a "straight-edge" for the stylus ensuring that the stylus travels in a straight line across the writing table despite any irregular motions of the belt on which it is mounted. The commutator has a pair of horizontal tracks parallel to each other and spaced apart from each other to contact the stylus simultaneously at two different positions along its length. Since the stylus receives the same signal from each track of the commutator as it traverses the commutator, any momentary interruption of driving current caused by oxidation, dirt, etc. at any position on one track is compensated by the provision of driving current at a corresponding position on the other track. Thus, uninterrupted reproduction is substantially assured.

As noted earlier, the stylus is carried on a belt mounted between two pulleys. One of these pulleys is the driving pulley. It is formed from a pair of freely rotating cylindrical pulley segments mounted on a common shaft and laterally separated from each other by a sprocket. The sprocket is driven from a shaft which is torsionally coupled to the same motor that drives the paper feed roller, and it engages corresponding sprocket holes on the stylus belt. A flywheel frictionally coupled to this shaft smooths out variations in the drive applied to the shaft by the driving motor. One of the pulley segments is flanged to limit side travel of the belt.

The other pulley consists of a freely rotating cylinder having an inner flange and having its rotational axis slightly skewed (by about 1° or 2°) to the axis of the driving pulley. The skew generates a small lateral force on the stylus belt to hold it against the flanges of both the driving and idler pulleys and thereby maintain the stylus at a uniform position with respect to the document being reproduced.

In addition to the sprocket holes, the belt has timing apertures to allow the writing cycle to by synchronized with the stylus position; this insures that the stylus starts its writing at the same position each cycle. A light source and a photoelectric cell positioned on opposite sides of the stylus belt sense the timing apertures and generate the requisite synchronizing signals.

The entire writing head comprising the driving pulleys, the stylus belt and stylus holder is rotably mounted on the receiver, so that it can be rotated back from the writing table for servicing or stylus replacement.

DETAILED DESCRIPTION OF THE INVENTION

The foregoing will be more readily understood from the following detailed description of the invention when read in conjunction with the accompanying drawings in which.

PAPER FEED

Figure 1:
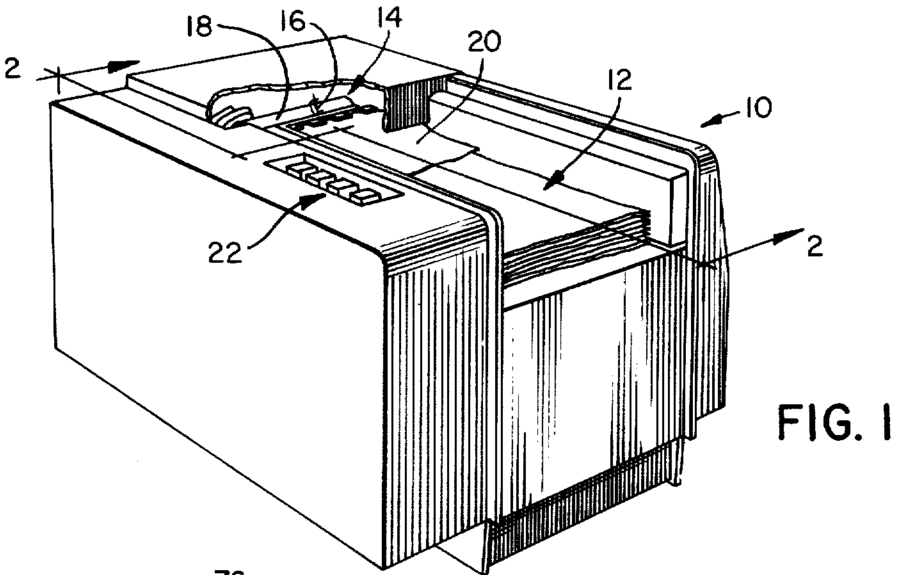
FIG. 1 is a view in perspective of a facsimile receiver in accordance with the invention.

In FIG. 1, a facsimile receiver 10 has a paper stacking and loading section 12 and a writing section 14 containing a stylus 16 mounted on a belt 18. The stylus 16 reproduces on a paper 20 information transmitted to the receiver 10 from a remote transmitter (not shown). Switches 22 are provided for turning the machine on and for performing other functions to be described below.

Figure 2:
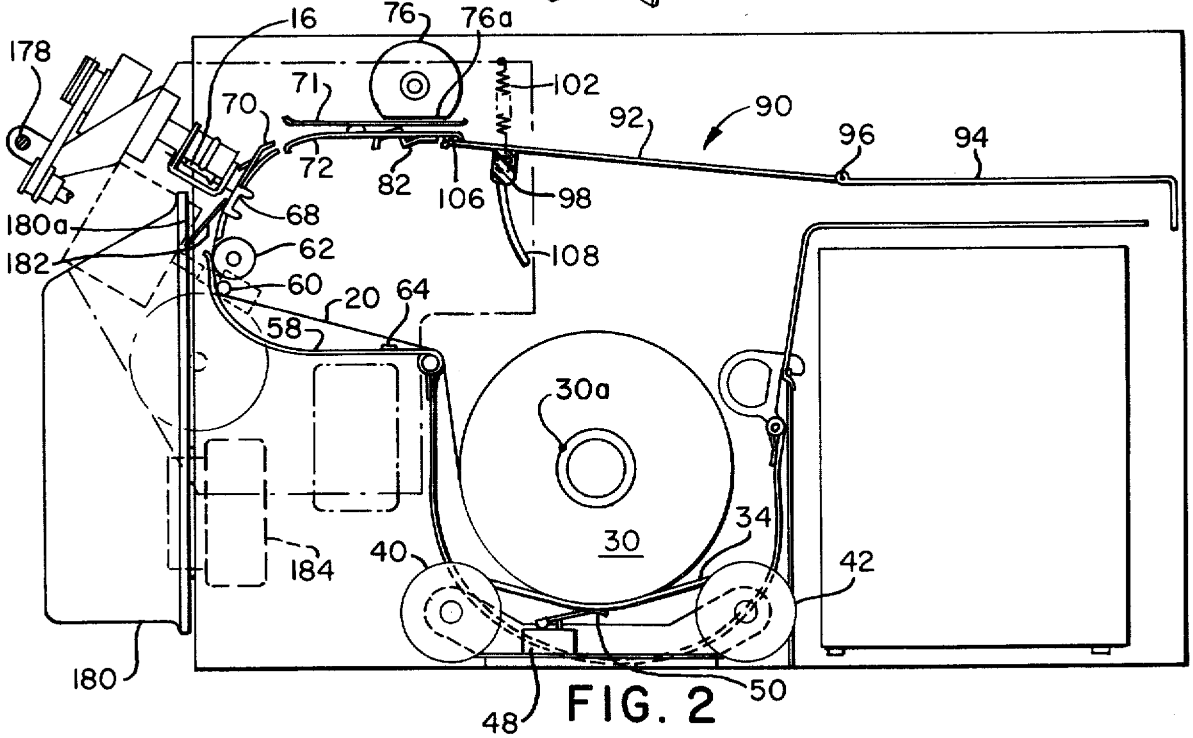
FIG. 2 is a side elevational view along the lines 2—2 of FIG. 1.
Figures 3, 4, 14A:
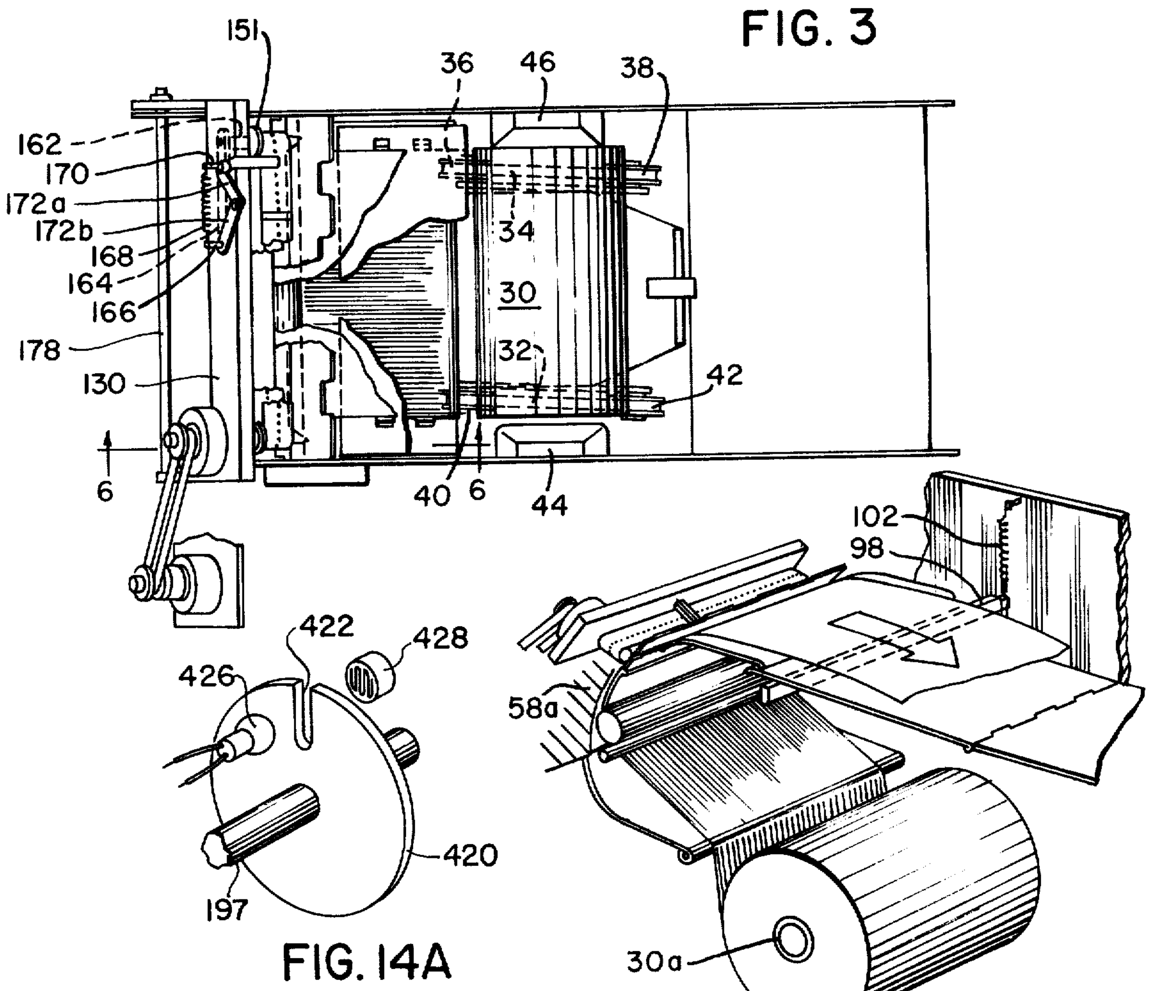
FIG. 3 is a top plan view of the receiver of FIG. 2 with portions being removed for the purposes of clarity.
FIG. 4 is a view in perspective of a portion of the receiver showing the path of paper through the receiver.
FIG. 14A is a view of the paper monitor.

Referring now to FIGS. 2–4, a roll 30 of paper is cradled on belts 32, 34 which run over free-wheeling rollers 36, 38 and 40, 42, (FIG. 3) respectively. A pair of guides 44 and 46 are positioned at opposite ends of the roll. These guides assist in centering the roll 30 when a new roll is placed in the machine. Additionally, the guide 46 accurately positions one side of the roll 30 for feeding to the writing station. This positioning is accomplished by canting the axes of the wheels 36, 38 and 40, 42 with respect to the axis of the roll 30 (by a few degrees) so that the roll 30 "rides" toward the guide 46 and seats its shoulder against that guide.

A normally closed microswitch 48 (FIG. 2) is seated under the roll 30 and has an arm 50 contacting the lower side of this roll. When the roll 30 has a sufficient quantity of paper on it, it presses down on arm 50 and holds switch 48 open. The end of the copy paper is glued on a carboard mandrel 30*a*. When the paper supply is nearly depleted, and the copy paper is advanced to reproduce the last document, the mandrel is pulled off the belts 32, 34 by the paper feed. This releases arm 50 to thereby close switch 48 and signal the need for paper replenishment. A sling 51 of flexible sheet material has one end pivotally attached to a rod 53 and the other end attached to a hook 55. The hook 55 has a lip 55*a* which normally rests on a wall 57 in the machine. In this condition the sling 51 extends underneath the roll 30 between the belts 32, 34. When paper is to be loaded into the receiver, the operator grasps hook 55 and pulls it upwardly and rearwardly (to the right in FIG. 2) to extend it to a horizontal position. The roll 13 is then placed on the sling and the sling lowered, the guides 44, 46 seating the roll in position on the belts 32, 34.

The sheet 20 fed from the roll 30 passes over a guide tray 58, underneath a bar 60, and along a concave guide 58A into the nip of a paper feed roller 62. A stop 64 is located at one edge of the tray 58 to guide the paper into the roller 62. On leaving roller 62, the sheet is pressed firmly against guide 58A by opposing forces created by the push of roller 62 on the sheet on the one hand and the retarding force created by a wiper 182 on the other. Wiper 182 is a plastic sheet which extends across the receiver from one side to the other and which presses the sheet 20 against a writing table 68. The tip of stylus 16 contacts the sheet 20 slightly beyond this point. On leaving the writing table 68, the sheet passes under a bridge 70 (shown more clearly in FIG. 10) and follows along between platforms 71 and 72 under a pair of extractor wheels 74, 76 (shown in perspective in FIG. 10) having a flattened segment 74*a*, 76*a*. A pair of spring steel arms 80, 82 fastened to the platform 72 extend through apertures in this platform beneath the extractor wheels 74, 76 (see FIG. 10). The sheet normally passes freely between the arms 80, 82 and wheels 74, 76.

Figures 10, 11:
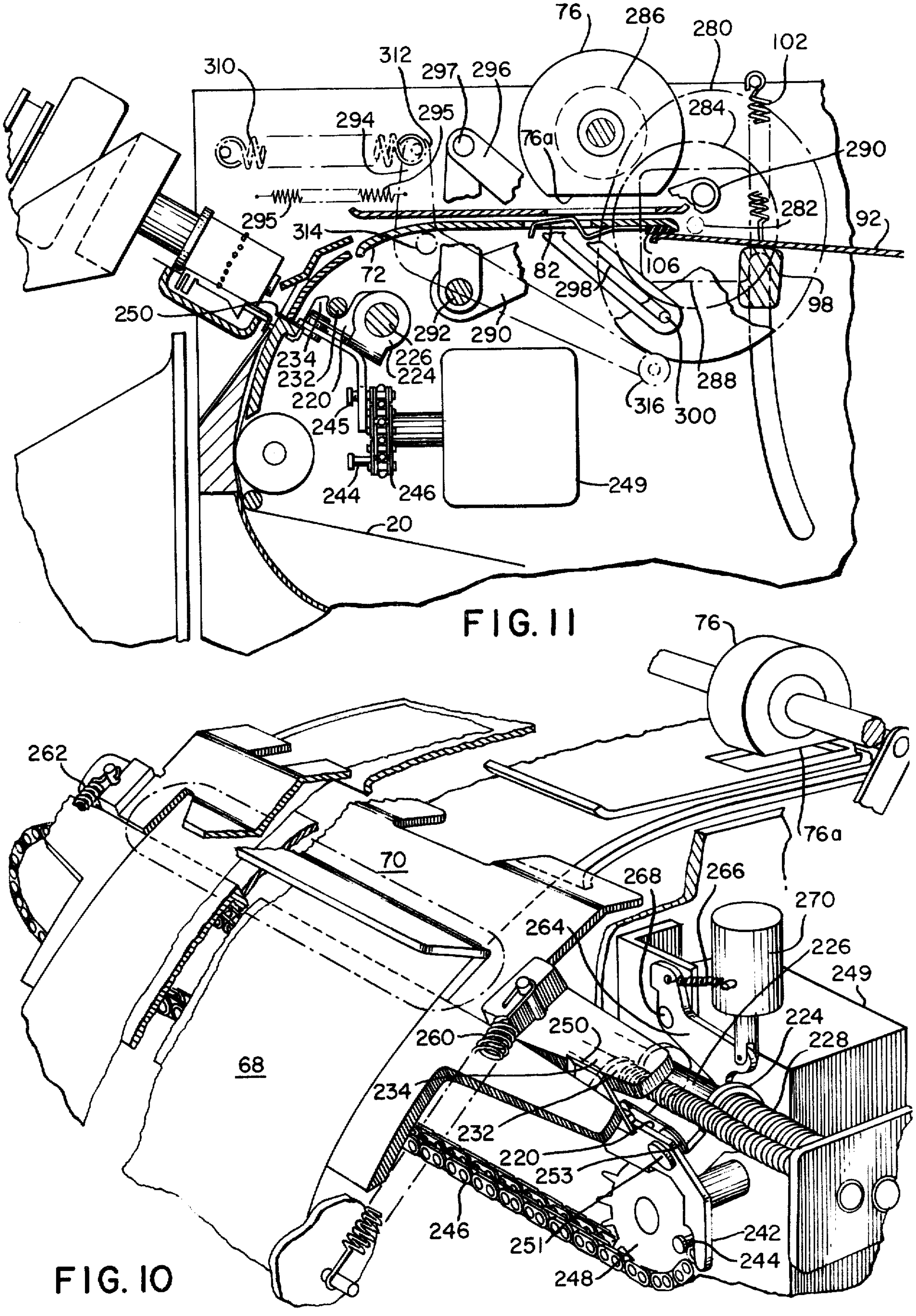
FIG. 10 is a view in perspective of the cutter mechanism of the receiver.
FIG. 11 is a side sectional view of the writing and paper extraction mechanism of the receiver.

After the document has been completely reproduced on the sheet 20 at the writing station, the sheet is cut to size by a cutter head (shown in detail in FIGS. 10 and 11). The extractor wheels 74, 76 are then rotated to grasp the reproduced document and eject it onto a tray 90 comprising a front document receiving platform 92 hinged to a rear coverplate 94 by means of a hinge 96. The platform 92 rides over a bar 98 which extends from side to side within the receiver housing and which is suspended at its opposite ends by means of springs 100, 102 (FIGS. 2 and 4) connected to the housing. The bar 98 has pins at its opposite ends which ride in corresponding grooves 108 in the housing. The forward end of the platform 92 is lodged under a pad 106 attached to the underside of platform 72.

Positioned below the housing 130 is a filter 180 (FIG. 2). Wiper 182 extends between the writing table 68 and an inlet section 180*a* of the filter 180 and extends laterally across the writing table 68 between the two sides of the receiver. It serves three functions: First, it contacts the writing table 68 at a point just below the point of contact with the stylus 16 and thus presses the sheet 20 firmly against the writing table at this point to ensure good reproduction. Second, by creating friction forces on the sheet 20, it causes the sheet to bend against the guide 58A to ensure smooth, continuous paper feed. Third, it serves to guide the efflux generated by the pyrographic stylus into the filter 180, thus preventing clogging of the paper feed by carbon particles. Upper section 180*a* of filter 180 is an air inlet section; air is swept by the pyrographic stylus and through the inlet into the body of the filter by means of an exhaust fan 184 adjacent the bottom of the filter. The filter 180 is held to the receiver housing by screws (not shown) and can be removed for renewal.

WRITING HEAD

Figure 5:
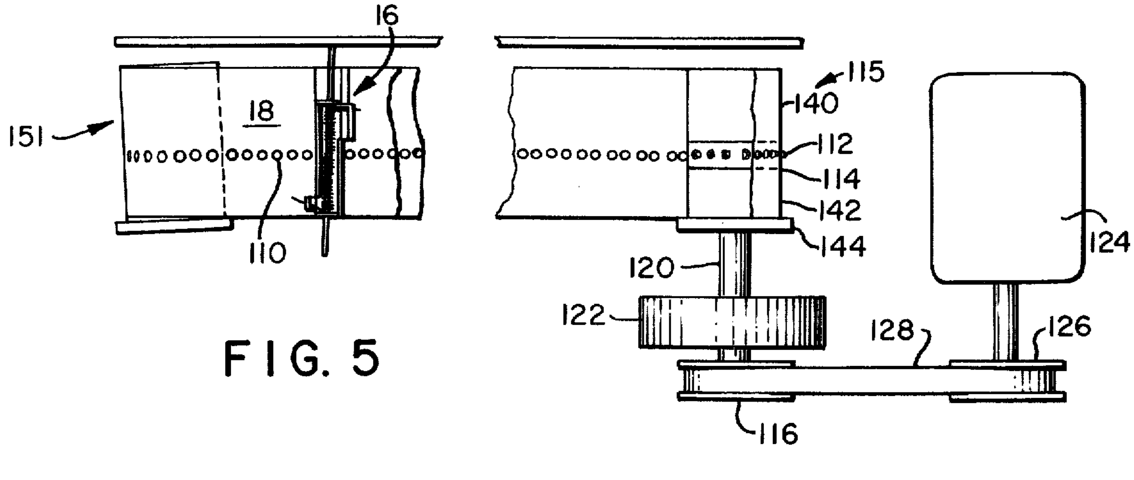
FIG. 5 is a top plan view showing the mounting of the stylus belt.
Figure 6:
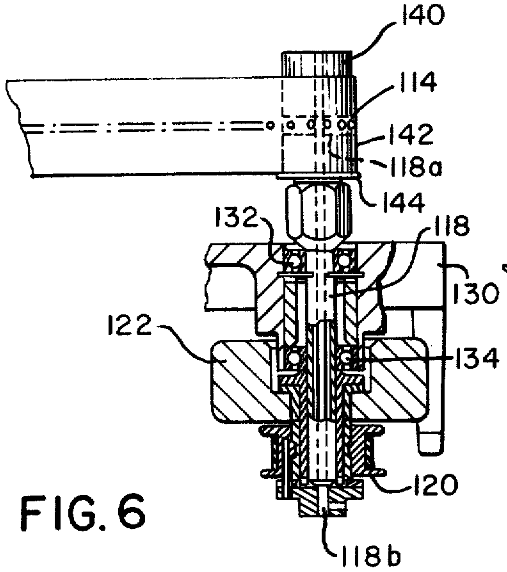
FIG. 6 is a top plan view of the stylus belt drive, with portions cut away to illustrate construction.

Referring now to FIGS. 5 and 6 in conjunction with FIGS. 2–4, the writing section 14 has a stylus 16 mounted on a belt 18, as noted previously. The belt 18 has a number of centrally disposed apertures 110 which mate with corresponding teeth 112 of a sprocket 114 forming part of a pulley 115. The sprocket 114 is driven from a pulley 116 to which it is coupled by means of a torsional coupler shaft 118. The shaft 118 is connected at its inner end 118*a* to the sprocket 114 and is connected at its outer end 118*b* to an outer hollow shaft 120 to which the pulley 116 is attached. A fly wheel 122 is frictionally coupled to this hollow shaft and, together with the torsional coupled shaft 118, smooths out variations in the driving forces applied to the pulley 116 and thus the stylus 16. The pulley 116 is driven from a motor 124 by a pulley 126 and a belt 128. The hollow shaft 120 is supported from a frame forming a writing head 130 by means of bearings 132 and 134.

Freely rotating cylindrical pulley segments 140 and 142 are mounted on a shaft in common with the sprocket 114. The segment 142 has a flange 144 against which belt 18 rides. Normally the segments 140, 142 and the sprocket 114 would rotate together as a unit and be fixedly coupled to each other; accordingly, the segments 140 and 142 would also frictionally drive the belt 18. However, any irregularities in segments 140, 142 or in sprocket 114 would tend to advance or retard the belt 18 with respect to the sprocket 14, and this would enlarge the apertures 110 in the belt and thus lead to erratic writing characteristics or even ultimate failure of the belt drive. By making the pulley segments 140, 142 freely rotating therefore, this problem is avoided.

A second flanged pulley 151 on which belt 18 rides rotates freely on its shaft on bearings. As will be noted in connection with FIG. 5, the axis of this shaft is not strictly parallel to the axis of the sprocket 114 and pulley segments 140, 142 but is instead inclined to the latter axis at an angle of a few degrees. This ensures that the belt 18 will ride firmly against its flange and thus positively locate the belt and therefore the stylus with respect to the writing table 68.

Figure 7:
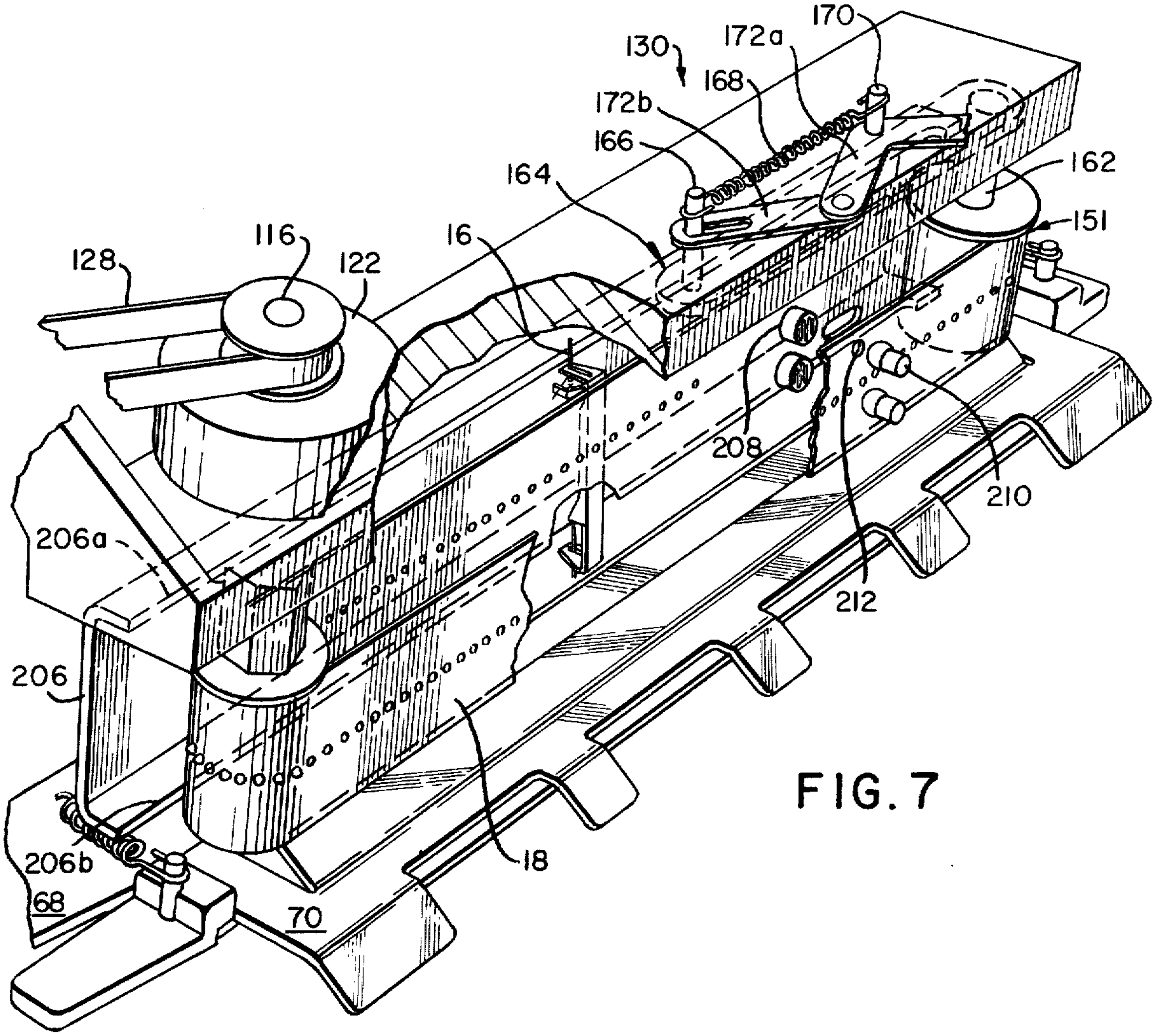
FIG. 7 is a view in perspective of the writing head of the receiver.

Referring to FIG. 7, the pulley 151 rides on a shaft 162 inside the writing head 130. The shaft is connected to a slide 164 which connects through the frame 130 to a pin 166 extending through a slot in the housing. Pin 166 is connected by a spring 168 to a similar pin 170 which is rigidly attached to the outside of the housing 130. A pivoted scissor arm 172 having arm segments 172*a* and 172*b* extends between the pins 166 and 170. The scissor arm 172 consists of a "overcenter" mechanism. When it is in the position shown, it extends the pulley 151 away from the pulley 151 and thus holds the belt 18 taut. However, when the center of the scissor arm 172 is pushed downwardly, the scissor arm pushes the pin 166 away from the pin 170, extends the spring 168, and moves the shaft 162 toward the pulley 140, thereby slackening the belt 18. This allows the belt 18 to be readily removed from the pulleys. To facilitate removal, the frame 130 is pivoted about a shaft 178 (FIG. 2) so that this housing can be rotated (in a counterclockwise direction as seen in FIG. 2) away from the writing table 68 and bridge 70, thereby providing free access to the pulleys 115 and 151 and the belt 18.

STYLUS

Figure 9:
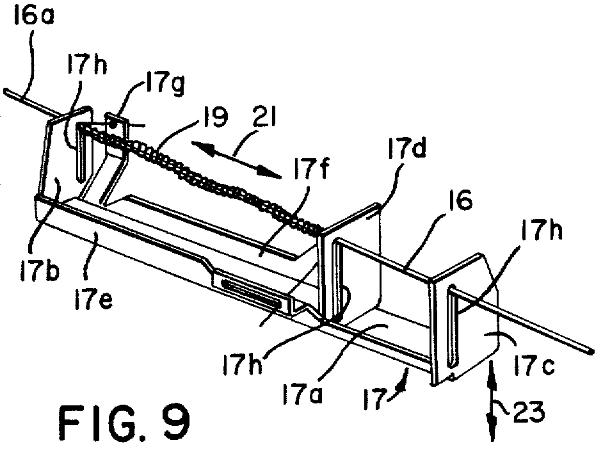
FIG. 9 is a view in perspective of the stylus housing.

Referring now to FIG. 9, the stylus 16 is mounted in a stylus housing 17. The stylus has a writing tip 16*a* for contact with the sheet on which a copy is to be produced. The housing is pressed from a single sheet of metal and has a bottom face 17*a*, front and rear, vertically extending end walls 17*b* and 17*c*, an intermediate wall 17*d* integral with a side strengthening lip 17*f*, a further side strengthening lip 17*e*, and a generally vertically extending arm 17*g*. Vertical apertures 17*h* are formed in the walls 17*b*–17*d*. A spring 19 holds the stylus within the housing; the spring is tack welded to the stylus at its forward end adjacent wall 17*b*. The forward end of the spring extends through an aperture in the arm 17*g*; the rear end of the spring extends through an aperture in the side wall 17*e*.

The bottom face 17*a* of the stylus housing is attached to the stylus belt 18 as shown in FIGS. 5 and 7. The housing 17 is mounted transversely across the belt so that it is essentially "square" with the belt edges. The stylus 16 itself, however, is cocked at an angle of a few degrees within the stylus housing so that when the stylus is in position for writing (see FIG. 7) the stylus tip lags somewhat behind the rear portion of the stylus in the direction of stylus travel. This helps to prevent "wobble" of the stylus.

As will be noted from FIG. 9, the spring 19 biases the stylus 16 both horizontally (in the direction of the arrow 21) and vertically (in direction of the arrow 23). The stylus tip is shown in its extended position in FIG. 9. When the stylus is mounted on belt 18 and brought into position against the writing table, the stylus tip is moved backwardly (toward the wall 17b) to spring load the stylus in a horizontal direction and create a slight degree of "writing" pressure for the stylus tip. Additionally, when in writing position, the stylus is spring loaded vertically (in the direction of the arrow 23) by means of a commutator bar against which it presses, as will be explained more clearly below.

Returning now to FIG. 7, when the stylus 16 is in the writing position, that is when the tip of the stylus is pressed against the writing table 68, the body of the stylus contacts a commutator bar 206. The bar is in the form of a U-shaped channel having upper and lower track members 206*a* and 206*b*. The stylus spring 19 (FIG. 9) presses the stylus firmly against both of these tracks so that electrical current which is applied to the commutator is transferred to the stylus and thence to the paper on which the stylus presses. Should dirt, oxidation or other causes interrupt the current applied to the stylus body through one of these tracks, current can still be applied through the other track and therefore the writing performed by the stylus is not interrupted.

A pair of photocells 208 and light sources 210 sense the location of apertures 212 on the tape 18. A first of these apertures is used to locate the beginning of a stylus writing line and is placed on the tape such that it allows the light source 210 to illuminate one of the photodectors 208 when the stylus is positioned at the beginning of a line. When this occurs, the photodector 208 transmits a signal to the writing control circuit to energize the commutator bar 206 with electrical signals corresponding to the information to be reproduced. A second of the photocell-light cell transducers is used to insure that the stylus 16 and stylus housing 17 are positioned out of the way of the cutter blade when this blade is energized to cut a document to size.

Figure 8:
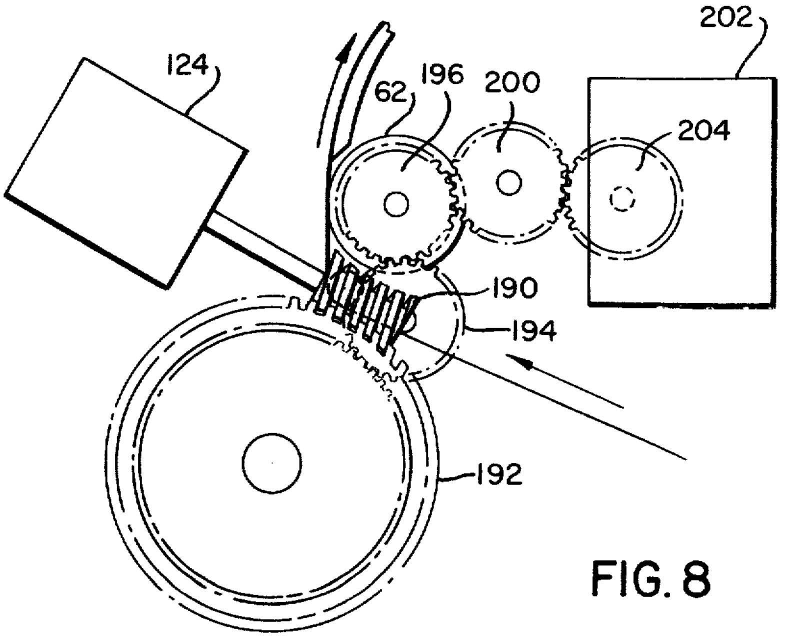
FIG. 8 is a sketch showing a portion of the paper feed and rapid paper advance mechanism.

After reproduction of a copy, the last line of the document must be advanced beyond the writing table before the document is cut to size. To do this, feed roller 62 (FIG. 2) is driven from motor 124 by means of a worm gear 190 as shown more clearly in FIG. 8. The gear 190 drives a gear train consisting of gears 192 and 194 and a gear 196 driving the shaft 197 of the feed roller 62. Gear 196 drives the feed roller so as to advance paper through the receiver. An additional gear 200 is driven from a motor 202 by an intermediate gear 204 containing a one-way clutch (not shown) which decouples the motor 202 from the motor 124. This drives feed roller 62 at a fast rate after the document has been reproduced, to thereby bring the last line of the document beyond the cutting area. The document is now cut to size.

PAPER CUTTER MECHANISM

Turning now to FIGS. 10 and 11, the cutter comprises a main body 220 extending upwardly to a collar 224. A rod 226 extends through the collar 224 and is connected at its opposite ends to the receiver housing. The body 220 is pivotally supported by rod 226 and rides along a guide rib 227 extending across the receiver beneath the writing table. A main spring 228 extends between the collar 224 and the receiver housing. A booster spring 230 is located on a rod 232 which also extends across the receive from one side to the other and which is connected at its opposite ends to the receiver housing. The spring 230 extends between the receiver housing and a flange 234 extending from the body 220 up to the shaft 232. Pivotally mounted on body 220 is an arm 242 extending downwardly into an engagement with one of two pins 244, 245 carried on a chain 246. The chain 246 is driven via a sprocket 248 from a motor 249.

A cutter blade 250 extends from the platform 220 into an aperture formed at the ends of the writing table 68 and the stylus bridge 70. The blade pivots about a pivot 251 against a spring 253. As seen in FIG. 10, the stylus bridge 70 butts against the writing table 68; it is held against the writing table by means of springs 260, 262 extending between the outer portions of the stylus bridge and the receiver housing. A lever 264 loaded by a spring 266 and pivoting about a pivot 268 is actuated by a solenoid 270. In the position shown, arm 264 butts against collar 224 and restrains the cutter head. When the solenoid is actuated, it lifts arm 264 and frees the cutter head which is then driven along the shafts 224 and 232 by means of the springs 228 and 230. The solenoid is actuated automatically each time the copy paper is advanced to a predetermined length by the rapid paper drive. The head carries the cutter blade along between the writing table and the bridge from one side to the other, and this cuts the sheet 20 on the table 68. During this process, the bridge 70 is moved slightly away from the writing table 68 by the blade 250 to accommodate the thickness of the blade.

DOCUMENT EXTRACTION

After the paper has been cut to size, the document must be removed from the receiver. This is accomplished by the document extraction mechanism (FIG. 11) as follows: A cam 280 mounted on a shaft 282 has an inner gear 284 connected to the shaft for driving a corresponding gear 286 on one of the cutter extractor wheels 76. The shaft 282 is driven by a paper extractor motor 288. The size of the gears 284 and 286 are such that the gear 286 makes two revolutions for every one revolution of the gear 284. A bale 290 is pinned to a shaft 292. The shaft 292 is rotated by a lever 294 which is pivotally connected to a link 296 having a slot 298 which is engaged by a pin 300 connected the cam 280.

When the extractor drive motor 288 is energized, it rotates gear 286 through gear 284; this causes the extractor wheel 76 to rotate. During the first 180° of rotation of cam 280, wheel 76 makes one full revolution. As the circular portion of this wheel comes into contact with a document positioned between the guide plates 71 and 72, it presses the document against the springs 82 and advances it to the rear of the machine (to the right in FIG. 11) by an amount dependent on the extent of the circular segment. When the extractor wheel 76 has rotated the point where the flat portion 76*a* is once again directly above the document so that the document is no longer advanced by it, the major portion of the document has been advanced onto the tray 92 while a portion (e.g. an inch or so) of the trailing or bottom edge of the document still lies between the guides 71, 72. This is extracted during the next 180° of rotation of cam 280 as follows.

During the first 180° of rotation of cam 280, the pin 300 rides loosely in the slot 298 of link 296 and the bale 290 is inactive. After the extractor wheel 76 has completed a full revolution, however, the cam 280 has rotated 180° and the pin 300 has rotated to a position where it begins to carry the link 296 with it. When this occurs, link 296 begins to rotate lever arm 294 and thus rotates shaft 292. Bale 290 is pinned to shaft 292 and thus the bale rotates downwardly (clockwise), thus drawing the remaining segment of the paper out from between the guide 71, 72 and down onto the tray 92. The tray 92 then pushes bar 98 downwardly in slot 106 against spring 102. As this occurs, the trailing edge of the paper flops onto the forward portion of the tray. As the cam 280 continues its rotation, the pin 300 gradually relieves the extending force on link 296 and lever 294 is thus returned to its original position by spring 295. At this point, the bale 290 rotates in a counterclockwise direction, increasingly relieving the pressure on tray 92 which then moves up under the lip 106 against which it presses the trailing edge of the stacked documents on the tray. This prevents them from curling on the tray.

During the first 180° of rotation of the cam 280, the extractor drive motor 288 need only supply enough torque to drive the extractor wheels 76 against the frictional forces between the paper and the guide plates 71, 72. During the next 180° of rotation of the cam 280, however, the extractor motor 288 must drive the platform 92 downwardly against the spring 102 and also against the force of the spring 295. Without some mechanism for smoothing out the torque requirements imposed on the extractor drive motor 288, the motor would have to be large enough to meet the largest torque demands on it during the last 180° of rotation of cam 280 and would therefore be greatly oversized with respect to the torque requirements for the first 180° of cam rotation.

To prevent the necessity for utilizing a motor dictated by peak torque requirements, rather than by average torque requirements, we utilize an energy storing mechanism to "smooth" the torque required throughout the cam rotation cycle. The energy storage mechanism comprises a stiff spring 310 connected at one end to the receiver housing and at the other end to a shaped lever 312 pivoted about a pivot 314 and having a freely rotating roller 316 at a far end engaging the cam 280. During the first 180° of rotation of the cam 280, a circular segment of the cam is presented to the roller 316 and accordingly the spring 310 is neither stretched nor compressed. During the last 90° of rotation of the cam 280, the cam rotates the arm 312 clockwise around the pivot 314 to extend the spring 310 and thereby store energy in the spring. During the third 90° of rotation, (from 180° to 270°) when the torque called for from the motor 288 is greatest, the cam surface presented to the roller 316 is such that the arm 312 rotates in a clockwise direction and delivers up its stored energy to the cam and thence to the bale 290 through pin 300 and link 296. The result is that a fairly constant torque requirement is presented to the motor 288 and thus a smaller motor than otherwise required can be used.

During extraction of the document from the receiver, the cutter blade remains at the far side of the receiver after it has cut the document to size. It is returned to its initial position when the motor 249 is energized. This occurs when a manual paper advance button is depressed or when the receiver is signalled that another document is to be transmitted to it. When motor 249 is energized, it drives chain 246 and a pin 245 at the far side of the receiver is swung around by the chain into a position where it catches arm 242, thereby retracting blade 250 against spring 253 and returning the cutter head to its initial position on the right-hand side of the receiver as shown in FIG. 11. As the cutter head reaches the solenoid 270, the collar 224 rides underneath the arm 264, elevating this arm in passing and allowing it to drop back down again to lock the collar 224 and thus the cutting head into position again until the solenoid 270 is again energized. The motor 250 is then turned off. During the return, the chain 246 brings the pin 244 to the far end of the receiver where it is available to pick up the cutter head for the subsequent return.

SCAN CONVERTER

As noted earlier, during the time required to reproduce a single line, the reproducing stylus spends only approximately half its time in the writing position, the remaining portion of its time being spent returning from the end of the line back to the starting position. The information signal presented to the receiver, however, is in the form of an analog waveform which is generally continuous in time with the exception of a brief interval at the start of each scanning line during which synchronizing signals are sent. It is therefore necessary to accommodate this waveform to the writing interval in the reproduction cycle. This is accomplished by the scan converter of the present invention.

Figure 12:
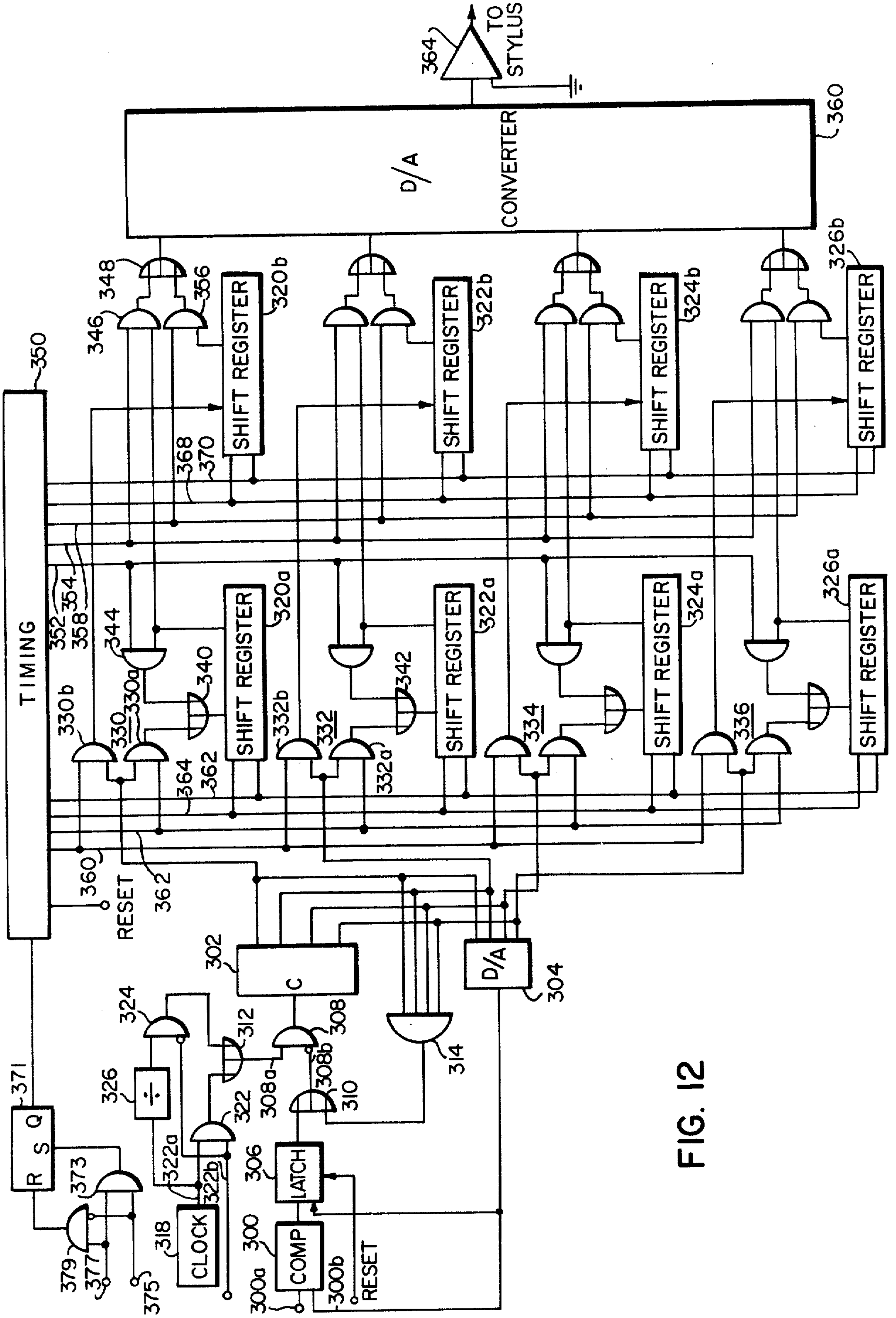
FIG. 12 is a schematic diagram of a scan converter in accordance with the invention.

Referring now to FIG. 12, the analog input containing the information to be reproduced is first digitized and then stored in a digital shift register. Digitization is accomplished by applying the analog input to a first input terminal 300a of a comparator 300 where its magnitude is compared with the magnitude of the count in a counter 302 appllied to a second input terminal 300*b* of the comparator. As long as the conversion rate is several times greater than the highest frequency component in the input, the input will not change significantly between conversions so that an initial sampling of the analog input is not required. The counter 302 is a 4-bit binary counter; its count is converted by a digital to analog converter 304 into an analog voltage for comparison with the voltage applied to unit 300. When the latter exceeds the count in the counter, the comparator sets a latch 306 to its "high" or "on" state. The output of the latch is applied to an AND gate 308 through an OR gate 310. Gate 308 has a conventional input terminal 308*a* to which clock pulses are applied from an OR gate 312 and also has an inhibit input terminal 308*b* to which the output of OR gate 310 is connected. Its output drives a "clock" or "shift" input of counter 302.

When the latch 306 is set, its output is high and the inhibit input 308*b* of gate 308 is energized; this prevents clock pulses from passing through this gate. When the latch 306 is reset, however, its output is "low" and clock pulses from gate 312 pass through gate 308 to the counter 302 to step the counter through its sucessive counting states. Thus, as long as the count in counter 302 is less than magnitude of the voltage applied to the comparator 300, the latch 306 is reset, gate 308 is open, and clock pulses are applied through it to step the counter through its count. When the count in the counter equals or exceeds the magnitude of the sampled voltage, latch 306 is set, gate 308 is inhibited, and the count is stopped.

The output of the counter is also monitored by an AND gate 314 whose output is connected to the inhibit input of gate 308 through gate 310. Should the count advance to its maximum value without a compression having been detected by the comparator 300, gate 314 opens and inhibits gate 308 to stop the count at this maximum value.

In order to make the receiver of the present invention compatible with transmitters having different clock rates, the clock pulses applied to gate 308 are not taken directly from a system clock but instead are first passed through a dividing network which allows the selection of the proper clock rate in accordance with the nature of the transmitter. A network which allows the selection of one of two clock rates, harmonically related to each other and synchronous with each other, is illustrated. A master or system clock 318 is connected via a lead 322*a* to one input of an AND gate 322 as well as to a frequency divider 326. A synchronizing signal from the remote transmitter determines at which of two clock rates the receiver is to operate. This signal is applied via a lead 322*b* to the other input of gate 322 as well as to an inhibit input of an AND gate 324. The outputs of gates 322 and 326 are applied to gate 308 via gate 312. When the synchronizing signal is high, gate 322 is enabled, gate 324 is disabled, and pulses from clock 318 are passed through gates 322, 312 and 308 to counter 302 without alteration of the clock rate. However, when the synchronizing signal is low, gate 322 is disabled, gate 324 is enabled, and the clock pulse rate is stepped down in the divider 326 before being applied to counter 302. It will be understood that any number of distinct clock rates may be provided for merely by enlarging the number of states of the synchronizing signal and adding appropriate frequency multipliers or dividers as well as corresponding steering gates.

The output of the counter 302 is a 4-bit binary number capable of representing 16 tonal values. It is applied in parallel to first and second pairs of storage and shift registers 320–326a and 320b–326b, respectively, through pairs of AND gates 330–336. These gates steer the contents of the counter 302 alternately to registers 320a–326a (hereinafter referred to as the "A" registers) and to registers 320b–326b (hereinafter referred to as the "B" registers). For example, the highest order bit position of the counter 302 is connected through OR gate 340 to the input of register 320a when gate 330b is energized, and is connected to the input of register 320b when gate 330b is energized. Similarly, the next highest order bit position of counter 302 is connected to the input of register 322a through an OR gate 342 when gate 332a is energized, and is connected to the input of register 322b when gate 322b is energized. The lower order bits are connected to the registers 324 and 326 in similar manner and thus need not be described further.

The output of register 320a is applied as a first input to AND gates 344 and 346. Gates 344 and 346 are energized from a timing network 350 via leads 352 and 354, respectively. Timing network 350 additionally energizes gates 330–336 via leads 360 and 362. The output of gate 344 is applied to gate 340, while the output of gate 346 is applied to an OR gate 348. In similar manner the output of register 320b is applied through an AND gate 356 to gate 348; gate 356 is energized from timing network 350 via a lead 358. The "readout" signals applied to gates 346 and 356 over leads 354 and 358 respectively are synchronized in timing network 350 with the stylus position signals derived from photodetector 208 (FIG. 7). The inputs to and outputs from the remaining registers are connected in similar fashion and need not be described in further detail. A digital to analog converter 360 receives the digital outputs of the A and B registers, converts them to a corresponding analog voltage, and applies this voltage to the reproducing stylus through a driver amplifier 364. The timing network is reset after each line by means of a flip-flop 371 and a gate 373 which "sets" flip-flop 371 on simultaneous receipt of a signal on lead 375 indicating receiver synchronization and a signal on lead 377 indicating the beginning of a new line. Flip-flop 371 is thereafter restored to a ready status awaiting receipt of the next "set" signal by means of a gate 379.

In the preferred embodiment, the shift registers 320–326 are dynamic MOS shift registers, type 1404. The registers require two separate clock inputs separated in time from each other; in the present embodiment, they are phased 90° apart. These clock inputs are supplied to the A registers from the timing network 350 via leads 362 and 364 and are supplied to the B registers from the timing network 350 via leads 368 and 370. Due to the nature of these registers, their contents must continuously be moved through the register, otherwise one or more bits will be lost. Accordingly, it is necessary to recirculate the contents of a register whenever readout is delayed beyond the time required to fill the register. The gates 340 and 344 associated with register 320a, and corresponding gates associated with the remaining registers, perform this function as will be described below in detail.

Figure 13:
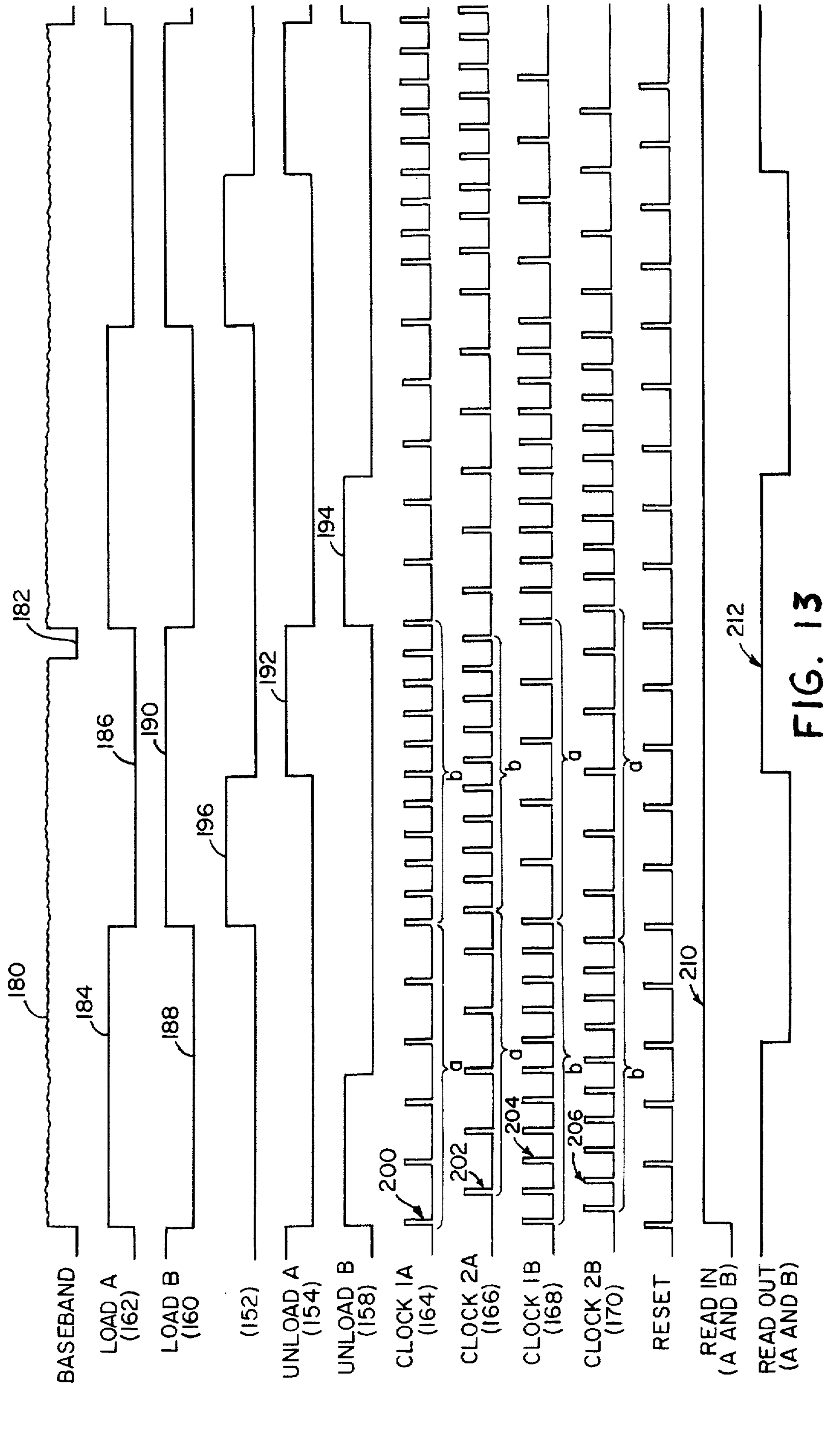
FIG. 13 is a sketch of waveforms of assistance in explaining the operation of the circuit of FIG. 10.

Referring now to FIG. 13, the input to the scan converter comprises an analog voltage having an information portion 380 and a synchronizing portion 382. The portion 380 corresponds to the information "read" by the remote transmitter while scanning a single line, while the portion 382 corresponds to the synchronizing signals sent at the start of the following scanning line. The waveforms controlling the loading of data bits from the counter 302 to the A and B storage registers are shown as the waveforms designated "load A" and "load B", respectively. These waveforms appear on the leads 362 and 360, respectively, in FIG. 12 and energize the gates 330a–336a and 330b–336b, respectively.

Each of these waveforms has an on (high) period equal to one-half the period of the baseband signal. The load A waveform is high 384 during the first half of the baseband signal, and is low (off) 386 during the second half of this signal. The load B waveform is just the opposite of this, that is, it is low 388 during the first half of the baseband signal and is high 390 during the second half of the baseband signal.

The unloading or readout of the data in the storage registers is controlled by the waveforms "unload A" and "unload B" in FIG. 13. The unload A waveform has a high portion 392 which occurs during the last half of the off period 386 of its corresponding load A waveform, while the unload B waveform has a low portion 394 which occurs in the first half of the off period 388 of its corresponding load B waveform. A "Recirculate" waveform having an on portion 396 is also shown in FIG. 13; this waveform occurs during the first half of the off period 386 of the load A waveform. Considering a single line of baseband and its subsequent synchronizing signal (e.g. portions 380 and 382) as comprising 360°, the load waveforms are high for 180°and are low for a like duration, while the unload waveforms are high for 90°and are low for 270°.

As the analog input is applied to the receiver, it is repeatedly digitized. During the first half of the baseband period, the load A waveform energizes gates 330a–336a and connects the counter 302 to the registers 120a–126a. During the second half of the baseband waveform, the waveform load B energizes the gates 130b–136b and connects the counter 302 to the registers 120b–126b. Thus, alternate halves of the baseband waveform are connected alternatively to the A and B registers so that half of each scanning line is temporarily stored in each register.

The binary digits are loaded into the storage registers and unloaded from them synchronously with clock pulse trains 400 and 402 (Clocks 1A and 2A, respectively) in the case of register A and clock pulse trains 404 and 406 (Clocks 1B and 2B, respectively) in the case of register B. The pulse trains 400 and 402 are 180° out of phase with each other. Similarly, the pulse trains 404 and 406 are also 180° out of phase with each other. Each pulse train has alternate low frequency portions a (corresponding to load cycles) and high frequency portions b (corresponding to unload cycles). The pulses driving the A and B registers are synchronized with each other as shown in FIG. 13.

Assume that both registers are initially empty and that an analog input is now applied to the receiver. The input is repeatedly digitized into a 4-bit number and the bits of each number are applied in parallel to the A register, initially. The pulse trains 400 and 402 begin to shift this data through the a register at the "slow" rate (in the embodiment described herein, this rate is of the order of 10.24KHz). At the end of the a register load period, the data in this register has reached the output and is ready for readout at twice the frequency at which it was read in. However, data is just beginning to be read into the B register at this time and it will not be ready for read-out until some time after the a register could complete its readout. Accordingly, the data in the A register is recirculated at this time. The recirculation is performed at the "fast" rate as shown by segment *b* in clock pulse trains 400 and 402.

When the B register is halfway through its loading period, unloading of the A register begins and is complete when the B register has finished read-in. At this time, read-out of the B register commences and continues during the first half of the following loading period of the A register. Thus, considering the A and B registers as a single storage unit, read-in is at a slow rate and essentially continuous as shown by waveform 410 in FIG. 13, while read-out is at twice the read-in rate but occurs only on alternate half cycles, as shown by waveform 412. The end result is that data is continuously received and stored synchronously with the incoming facsimile information, regardless of whether the instantaneous position of the stylus is on the writing table or on the bridge above the table. Read-out, however, is performed only when the stylus is properly positioned on the writing table.

SYSTEM CONTROL

Figure 14:
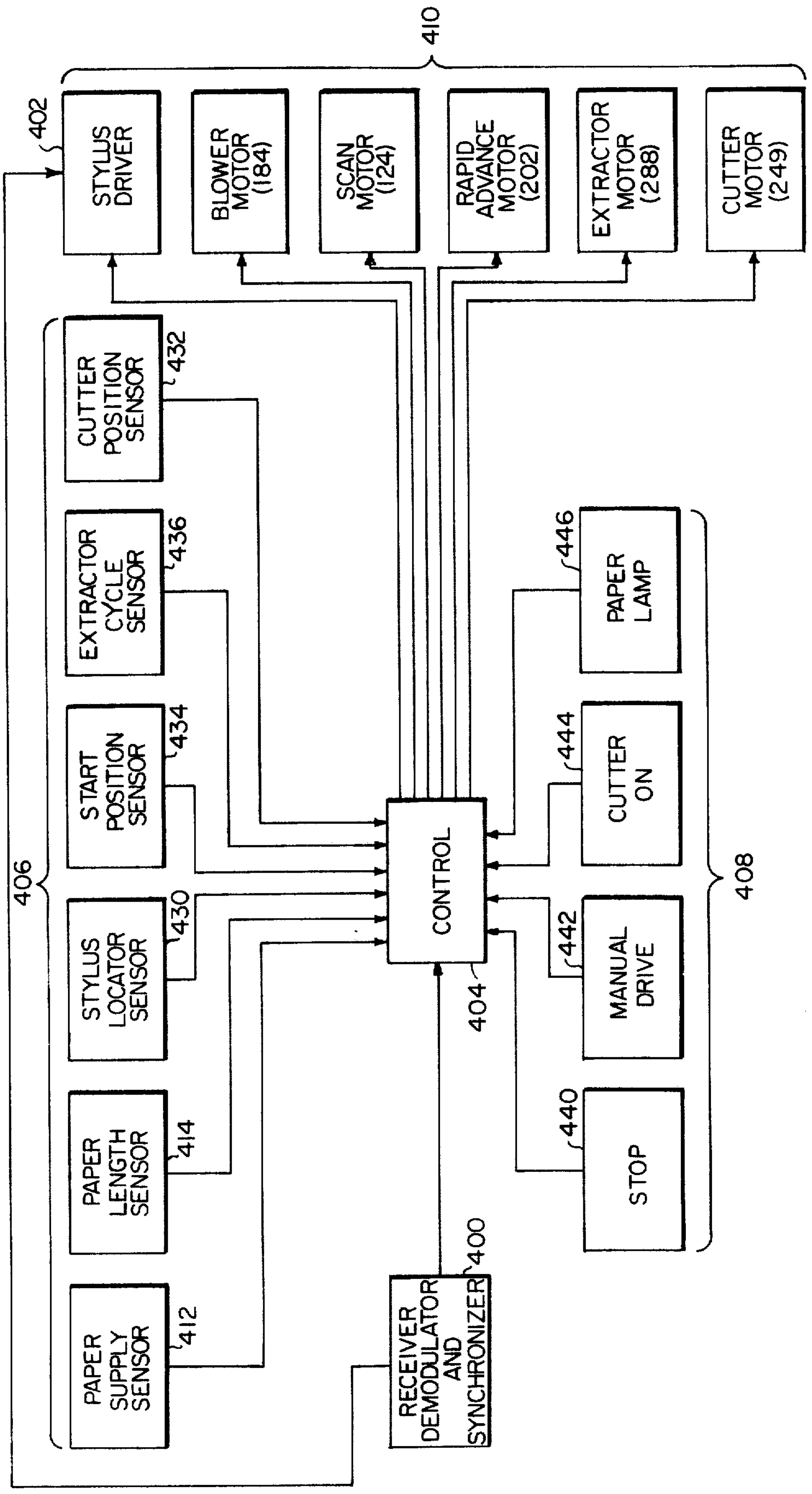
FIG. 14 is a block diagram of the overall control.

Referring now to FIG. 14, the overall control for the receiver is indicated in block diagram form. The incoming analog facsimile signal is applied to a demodulator and synchronizer 400 in the receiver. The demodulator and synchronizer advantageously is constructed as described in U.S. Pat. No. 3,614,319 referred to previously, and may also incorporate bandwidth compression circuitry of the type described in the U.S. application Ser. No. 115,189 filed Feb. 16, 1971 by Robert E. Krallinger, et al. The demodulator and synchronizer provides an analog output representative of the contents of a document being scanned at a remote receiver. It supplies this output to a stylus driver 402 and also provides a synchronizing signal to a control unit 404. The control unit energizes the blower motor 184 at the start of a copy and also controls the stylus driver. The stylus driver supplies electrical signals to the stylus 16 for reproduction of a document on a copy sheet 20, as described previously. Included in the stylus driver is the data conversion circuit illustrated in FIG. 12, which accepts the analog input, digitizes it, and reads it out at twice its input rate for application to the stylus 16 only wne the stylus is in writing position.

The control unit 404 receives inputs from a number of sensors, collectively designated as 406 as well as a number of manual controls, collectively designated 408, and energizes the stylus driver 402 and a number of motors, collectively designated 410, at appropriate times. Among the sensors 406 is a paper supply sensor 412 (which includes the micro-switch 48 of FIG. 2). It monitors the supply of paper in the machine and supplies an "out of paper" signal to the control unit 404, when the paper supply is exhausted. When this occurs, the control unit 404 signals the demodulator and synchronizer 400 that further copies cannot be made and this information is forwarded to any remote transmitter which attempts to contact the receiver for further transmission.

A paper length sensor 414 monitors the length of the document being reproduced. The control unit 404 terminates the normal paper advance when this length equals a predetermined length set by the operator in accordance with the setting of a paper length switch (not shown) in the sensor 414. A convenient paper monitor is illustrated in FIG. 14A and consists of a disc 420 having a notch 422 in its outer periphery and attached to the shaft 197 of feed roller 62 (FIG 1). The disc is positioned to rotate between a light source 426 and a photocell 428. The photocell 428 is connected to a counter (not shown) whose count is advanced by one each time the slot 422 passes by the photodetector 428. The contents of the counter is compared with a reference (for example, a settable counter) which generates a signal proportional to the setting of the paper length switch in sensor 414. When the contents of the counter exceeds the reference, it signals the control unit 404 to terminate the normal paper drive. This is done by varying the drive to the scan motor 124 as shown in FIG. 14.

A stylus locator sensor 430 senses the position of the stylus with respect to the writing table and steps the scan motor 124 to position this stylus at a point out of the line of travel of the cutter-blade. Thereupon the control unit 404 energizes the cutter-return motor 249 to return the cutter to its initial position as previously described. When it returns to this position, a cutter position sensor 432 signals the control unit 404 to cut off further drive to the motor 249.

A "start position" sensor 434 signals the control unit 404 whenever the stylus is in writing position at the beginning of a line. The control unit 404 thereupon energizes the stylus driver 402 to enable reproduction of a line. The sensor 434 is formed by means of a photocell 208, a light source 210 and an aperture 212 as shown in FIG. 7.

After the sensor 414 has sensed that the desired length of paper has been fed to the writing station, it signals the control unit 454. This energizes the rapid advance motor 202 which advances the document a slight distance (an inch to an inch and a half) beyond the writing station. The cutter is then released as previously described nd the document is thereupon cut to size. The extractor motor 288 is then energized from the control unit 404 and the document is extracted from the guides beyond the reproducing area and stacked on a receiving tray 92 (FIG. 2) as previously described. At the end of the extraction cycle, an extractor cycle sensor 436 (which may comprise a microswitch adjacent the cam 280 (FIG. 11) and which is actuated by a pin on this cam when the cam has rotated through 360 degrees) signals the control unit 454 which thereupon terminates the drive to the extractor motor 288. At this point the reproduction process is complete and the receiver awaits a new synchronizing signal to indicate that a new document is to be transmitted from a remote receiver.

The manual controls 408 include a stop button 440 which halts operation of the receiver; a manual drive button 442 which advances paper past the writing station as long as it is depressed and which assists in loading the receiver; and a "cutter on" button 444 which removes a latch from the cutter so that copies can be cut to length as desired. When this button is not depressed, the receiver makes copies on a continuous roll.

CONCLUSION

From the foregoing it will be seen that we have provided an improved facsimile receiver which reproduces documents automatically at remote locations while unattended. The receiver utilizes a single stylus to form the reproduction and to thereby avoid the myriad problems attendant on accurately positioning and synchronizing two or more styli.

The possibility of paper jams is minimized by utilizing a roll of paper which is cut to size as needed. The operation of the reproducing stylus, and the feed of paper to the writing station, are synchronized with each other to insure good copy quality. The copies are automatically removed from the writing station and stacked in sequence by an effective extractor mechanism.

It will be understood from the foregoing that various changes may be made in the preferred embodiment illustrated herein, and it is intended that the foregoing material be taken as an illustrative only and not in a limiting sense, the scope of the invention being defined in the claims.

Having described our invention, we claim:

1. A facsimile receiver for reproduction of a document in accordance with analog information obtained from scanning a document line-by-line at a remote transmitter comprising:

A. a writing table having a flat segment for movement of a stylus therealong;

B. means feeding a copy sheet to said writing table;

C. a single stylus mounted to traverse said writing table in straight line motion for reproduction of a document during a portion of its motion;

D. means for converting the analog signal corresponding to each line of scanning to a corresponding digital signal;

E. first and second storage registers for storing first and second successive portions of said digital signal respectively; and F. means for applying the contents of said register to said stylus in sequence at twice the rate at which said contents were read into said registers when said stylus is in position for writing on said table.

2. A facsimile receiver according to claim 1 in which the contents of said first register corresponding to said first portion of the digital signal are applied to said stylus simultaneously with the storage of at least a part of the second portion of the digital signal in the second storage register.

3. A facsimile receiver according to claim 2 in which:

A. the first portion of said digital signal corresponds to one half of a line of the corresponding analog signal and is read into said first register comtemporaneous with the receipt of said half line, and B. the second portion of said digital signal corresponds to the remaining half line of the corresponding analog signal and is read into said second register contemporaneous with the receipt of said remaining half line.

4. A facsimile receiver according to claim 3 in which the contents of the first register are applied to said stylus during a first half of the period in which the second digital signal portion is being stored in said second register, and in which the contents of the second register are applied to said stylus during the second half of the period in which the second digital signal portion is being stored in said second register.

5. A facsimile receiver for reproducing a document line-by-line in accordance with information signals derived from scanning a document line-by-line at a remote transmitter, said receiver comprising:

A. a writing table having a flat, transversely extending surface for supporting a sheet on which a document is to be reproduced;

B. a stylus mounted to traverse said table from one side to the other in contact with said sheet during reproduction of a document and to return along a path out of contact with said sheet to an initial position after each such traversal;

C. an analog to digital converter for digitizing the information signals received at the receiver;;

D. digital storage means comprising first and second digital storage registers for temporarily storing the digitized signals, a first portion of the digital signal for each line being read into said first register at said first rate, and a second portion comprising the remainder of the digital signal for each line being read into said second register at said first rate immediately following the reading of said first portion, said first and second portions being read out of said registers seriatim and applied to said stylus at a rate twice said first rate;

E. a digital to analog converter for converting the stored digital signals to analog form prior to application to said stylus; and F. means for applying electrical driving current to said stylus from said storage means only when said stylus is traversing said table.

6. A facsimile receiver according to claim 5:

A. in which the analog to digital converter digitizes the information signals by performing successive conversions on said signal, each conversion generating a plurality of digital bits representing the converted number, B. in which each digital storage register comprises a plurality of register modules equal in number to the number of bits in each conversion and each connected to receive a separate one of said bits for storage, and C. which includes means to shift said bits through said registers in synchronism.

7. A facsimile receiver for reproducing a document line-by-line in accordance with information signals derived from scanning a document line-by-line at a remote transmitter, said receiver comprising:

A. a writing table having a flat, transversely extending surface for supporting a sheet on which a document is to be reproduced;

B. a stylus mounted on a belt extending between a driving and a driven pulley positioned at opposite ends of said table, said belt carrying said stylus across said table at substantially a constant velocity and in contact with said sheet during reproduction of a document and returning said stylus along a path out of contact with said sheet to an initial position after each such traversal;

C. said driving pulley including inner and outer pulley segments freely rotating on a shaft and a driven sprocket coaxial with, and interposed between, said segments and connected to drive said belt;

D. means for storing information signals received from said transmitter; and

E. means for applying electrical driving current to said stylus from said storing means only when said stylus is traversing said table.

8. A facsimile receiver according to claim 7 in which one of said pulleys has a flange thereon and in which the axis of rotation of said pulley is skewed with respect to the axis of rotation of the other said pulley to cause said belt to ride against said flange and thereby accurately fix the location of said belt with respect to said table.

9. A facsimile receiver according to claim 7 which includes:

A. a driving motor

B. a flexible belt coupling said driving motor to said driving pulley, and

C. a torsion bar coupling said pulley to said sprocket whereby variations in the drive from said motor are coupled to the driving sprocket only through said torsion bar.

10. A facsimile receiver according to claim 9 which includes a flywheel frictionally engaged on said shaft and rotatable relative thereto during periods of shaft acceleration or deceleration in excess of a predetermined amount, said flywheel thereby smoothing drive variations from said driving motor.

11. A facsimile receiver according to claim 7:

A. in which said belt includes at least one aperture therein for accurately marking a position on said belt, and B. which includes detector means responsive to the passage of said aperture thereby to generate a locator signal indicative of the belt position.

12. A facsimile receiver according to claim 11 in which:

A. said detector is positioned such that said aperture passes said detector and generates a locator signal when the stylus enters into writing position on said table, and B. said locator signal signals said storing means to energize said stylus.

13. A facsimile receiver for reproducing a document line-by-line in accordance with information signals derived from scanning a document line-by-line at a remote transmitter, said receiver comprising:

A. a writing table having a flat, transversely extending surface for supporting a sheet on which a document is to be reproduced;

B. a stylus mounted to traverse said table from one side to the other in contact with said sheet during reproduction of a document and to return along a path out of contact with said sheet to an initial position after each such traversal;

C. a commutator bar adjacent said table and having at least a pair of spaced tracks, each contacting said stylus at different points thereof when the stylus traverses said table for reproduction;

D. means for storing information signals received from said transmitter; and

E. means for applying electrical driving current to said stylus from said storing means only when said stylus is traversing said table.

14. A facsimile receiver according to claim 13 in which said stylus is mounted on an endless belt which carries the stylus across the table in a first direction for writing and which thereafter returns the stylus in the opposite direction to an initial position.

15. A facsimile receiver according to claim 13 in which said stylus comprises a linear wire segment mounted in a stylus housing, said housing being fixed to a belt extending between a driving and a driven pulley positioned at opposite ends of said table and carrying said stylus transversely across said table and in contact therewith as it moves over said pulleys.

16. A facsimile receiver according to claim 15 which includes spring means biasing said stylus against said table when said stylus is moved therealong.

17. A facsimile receiver according to claim 16 in which said spring means also biases said stylus against a commutator bar positioned adjacent said table for supplying writing current to said stylus.

18. A facsimile receiver according to claim 17 in which said spring means comprises a spring coiled around said stylus and providing both tensional and torsional forces to urge said stylus simultaneously in two transverse directions corresponding respectively to the directions of said table and said commutator bar with respect to the stylus.

19. A facsimile receiver for reproducing a document line-by-line in accordance with information signals derived from scanning a document line-by-line at a remote transmitter, said receiver comprising:

A. a writing table having a flat, transversely extending surface for supporting a sheet on which a document is to be reproduced;

B. a stylus mounted to traverse said table from one side to the other in contact with said sheet during reproduction of a document and to return along a path out of contact with said sheet to an initial position after each such traversal;

C. a bridge which said stylus traverses in its return and which spaces the stylus from said document during said return, said bridge comprising:

1. a lower plate over which said document passes, and
2. an upper plate, spaced from said lower plate, over which said stylus passes out of contact with said document on its return;

D. means for storing information signals received from said transmitter; and

E. means for applying electrical driving current to said stylus from said storing means only when said stylus is traversing said table.

20. A facsimile receiver according to claim 19 in which said bridge and said writing table are butted against each other edge to edge such that the flat surface of the writing table and an upper surface of said lower plate form a generally continuous surface over which a document paasses during reproduction and which includes at least one spring normally maintaining said bridge and said table butted together but allowing them separate from each other when a force is applied thereto.

21. A facsimile receiver according to claim 20 which includes:

A. a cutter blade, and

B. means driving said cutter blade along the mating face between said table and said bridge to sever a document thereon.

22. A facsimile receiver according to claim 21 in which:

A. said pulley system comprises a driving and a driven pulley, and

B. said line comprises a chain mounted for rotation on said pulleys.

23. A facsimile receiver for reproducing a document line-by-line in accordance with information signals derived from scanning a document line-by-line at a remote transmitter, said receiver comprising:

A. a writing table having a flat, transversely extending surface for supporting a sheet on which a document is to be reproduced, said table being formed from first and second transversely extending table segments, at least one of which is yieldingly movable in a direction at right angles to said transverse direction to define therebetween a transversely extending slot;

B. a cutter comprising:

1. a cutter blade positionable to ride in said slot and sever the sheet above said slot, and
2. cutter driving means for carrying said blade in said slot scross the table;

C. means for feeding a continuous sheet to said writing table for reproduction;

D. a stylus mounted to traverse said table from one side to the other in contact with said sheet during reproduction of a document and to return along a path out of contact with said sheet to an initial position after each such traversal;

e. means for storing information signals received from said transmitter; and

F. means for applying electrical driving current to said stylus from said storing means only when said stylus is traversing said table.

24. A facsimile receiver according to claim 23 in which the cutter driving means includes:

A. a transversely extending bar positioned adjacent said table and generally parallel thereto for supporting said cutter body thereon as it traverses said slot, B. a spring coiled around said bar for driving said cutter body through said slot, and C. means restraining movement of the cutter body until the sheet is to be severed.

25. A facsimile receiver according to claim 23 in which the restraining means includes:

A. an arm positionable to restrain movement of the cutter body, and

B. a solenoid energizable to remove said arm from the restraining position to thereby free said cutter for motion through said slot.

26. A facsimile receiver according to claim 25 which includes means for returning said cutter to an initial position after the cutter has traversed said slot, said means comprising:

A. a pulley system

B. a line mounted on said pulley system for movement thereby from one end of the table to the other and having means thereon to contact said cutter body, and C. a motor for driving said pulley system when said cutter is to be returned to its initial position.

* * * * *